Patented May 2, 1950

2,505,866

UNITED STATES PATENT OFFICE 2,505,866

PRINTING INK

Ernest D. Lee, Teaneck, and Rupert J. Schefbauer, Jr., Union City, N. J., assignors to Interchemical Corporation, New York, N. Y., a corporation of Ohio No Drawing. Application May 8, 1947, Serial No. 746,858

4 Claims. (Cl. 106—30)

This invention relates to printing inks, and aims to provide typographic and lithographic printing ink of the solvent resin type characterized particularly by extremely rapid drying under heat.

Typographic and lithographic printing inks were, until a short time ago, made almost exclusively from drying oils. Recently, however, drying oil inks have been largely supplanted, particularly in the field of magazine printing, by inks of the type disclosed in the Gessler U. S. Patent No. 2,087,190; the vehicles of these inks comprise essentially solutions of binder in solvent which is relatively non-volatile at ordinary room temperature (ca. 20° C.), but which volatilizes very rapidly from films (like ethyl alcohol at 20° C.) when heated to temperatures of the order of 150° C. These inks are ordinarily applied to paper and the like from conventional typographic printing presses, and the prints are then passed through ovens heated to 1000–2000° F. at such a speed that the paper does not exceed its scorching point. The solvent in the ink, which is non-volatile at room temperature, so that the ink remains stable on the press, vaporizes almost immediately from the thin films at the elevated temperatures, thus drying the ink.

The problem of lithographic printing with such inks is complicated by the fact that lithographic printing is done by offsetting the ink onto a rubber or composition blanket, so that it becomes essential to find solvents which will have no substantial effect on the blankets. Such inks are disclosed in the Gessler et al. U. S. Patent No. 2,285,430, issued June 9, 1942; the inks therein disclosed have vehicles which comprise resins dissolved in specially treated petroleum hydrocarbons which have the content of aromatic and unsaturated compounds reduced to a dimethyl sulfate value of 4 or less, and preferably to a dimethyl sulfate value of 1 or less.

In the formulation of this type of ink for either typographic or lithographic printing, the choice of resin is extremely important, since resins vary considerably in their solvent retention; thus, using the same solvent, inks made from two different resins may dry at somewhat different rates. Furthermore, resins vary in solubility so that it may require more or less solvent to obtain a given body, and more or less solvent may have to be evaporated to get a film of the necessary dryness. In general, it has been the experience of the art that in order to obtain the desirable drying characteristics, relatively expensive resins are necessary.

In E. D. Lee U. S. Patent No. 2,409,215, which issued October 15, 1946, inks of this type are described which employ resins derived from Utah coals, dissolved in petroleum hydrocarbons which are substantially non-drying at 20° C., and which evaporate rapidly at 150° C., these inks are relatively inexpensive, yet dry as well as the best of the synthetic resins heretofore available.

In further work with these resins in printing ink, we have discovered how to produce inks which dry very much more rapidly under heat than the very best petroleum hydrocarbon-resin inks heretofore available, drying with as much as 40% less heat than known resins.

Our new fast drying inks comprise dispersions of pigment in solutions of certain Utah coal resins in petroleum hydrocarbons which are slow drying to substantially non-drying at 20° C., but which evaporate rapidly at 150° C. The resins used in turn are the fractions derived from Utah coal resins which are precipitated on dilution of a 25–45% isohexane solution of the soluble coal resins to 10% concentration.

The method of preparing these resins is described and claimed in our copending application Serial No. 746,857 filed May 8, 1947. In general, the method involves isolating the hexane soluble resin from the crude resin obtained by froth flotation of Utah coal, in the form of a concentrated solution, e. g. 25–45% in isohexane. On dilution to 10%, a fraction precipitates, which is a resin of the class used in the inks of this invention. The resin is of high melting point and is insoluble in isohexane in the absence of the lower melting resins. Typical examples of the inks made in accordance with the invention are the following:

Example I

Typically, a 35% solution of hexane soluble coal resin, which is dissolved in 2-methyl pentane, will yield, on dilution to 10%, 18% of precipitated resin with a melting point of 240–260° C.

Example II.—Varnish 38.75% precipitated coal resin of Example I
61.25% petroleum solvent—Boiling range (5–95%) 245–259° C.—Kauri Butanol value 26

The resin is melted and reduced with the solvent. The varnish has a viscosity of about 12 poises.

Example III.—Black ink

| | Parts by weight |
|---|---|
| Varnish of Example II | 67.4 |
| Paraffin wax | 2.5 |
| Talc | 2.5 |
| Lamp black | 1.8 |
| Carbon black | 12.4 |
| Iron blue | 5.3 |
| Toner—40% alkali blue, 60% varnish of Example II | 4.5 |
| Solvent of Example II | 3.6 |
| | 100.0 |

The material is ground on a three roll mill in conventional fashion.

It was tested on a proving press, and found to be stable for about 35 minutes; prints could be dried by passing through a laboratory heater at a speed of about 750 feet per minute.

Example IV.—Black ink

Example III was reproduced, except 5 parts of the varnish was replaced by bodied linseed oil (litho oil) and 0.6 part by lecithin.

This ink was compared with an identical ink in which the varnish was replaced by a synthetic resin varnish in the same solvent, using one of the best of the commercial synthetic resins available for this purpose. Under the identical conditions used with Example III, Example IV was stable 50 minutes, the known synthetic resins ink 60 minutes; Example IV ink dried at 750 feet per minute, and the regular ink at 450 feet per minute. The finish of the regular ink was not as good as that of Examples III and IV.

Example V.—Yellow ink

40% by weight varnish of Example II
60% by weight Primrose chrome yellow gave a printable ink which was rather dirty owing to the dark color of the varnish.

Similar inks made with standard reds (e. g. eosine red, red for lake C) and blues (peacock blue, iron blue) were thrown off color slightly by the rather dark varnish, but not too badly.

Lithographic printing inks can be made very much like the examples, although the body should ordinarily be stiffer; they work nicely, and dry well by absorption with paper, without heat.

All of the inks show the same very rapid drying rate.

While only one varnish is shown in the examples, other resins prepared by fractionation as indicated, and other petroleum solvents in the indicated range can be used, as well as other pigments, surface-active agents, waxes and the like. Furthermore, additions of oils and resins can also be made without losing the benefits of our invention provided they are not of major proportion in relation to the special coal resin fraction.

We claim:

1. A printing ink comprising pigment dispersed in a vehicle, which comprises a solution of a resin in a petroleum hydrocarbon which is slow drying to substantially non-drying at 20° C., but which volatilizes very rapidly at 150° C., the resin comprising the fraction of Utah coal resin which is precipitated on dilution of a 25–45% solution of the coal resin in isohexane to 10% concentration with isohexane.

2. A printing ink comprising pigment dispersed in a vehicle, which comprises a solution of a resin in a petroleum hydrocarbon which is slow drying to substantially non-drying at 20° C., but which volatilizes very rapidly at 150° C., the said resin comprising a resin derived from resin-bearing coals of the Utah type, and being obtained from said coals by a process comprising separating the crude resin from the bulk of the coal to produce a resin concentrate of resin admixed with coal, separating the soluble resin content of the concentrate in the form of a clear isohexane solution containing 25 to 45 per cent of resin, diluting the clear resin solution to about 10 per cent concentration with isohexane, and recovering the precipitated resin.

3. A printing ink comprising pigment dispersed in a vehicle, which comprises a solution of a resin in a petroleum hydrocarbon which is slow drying to substantially non-drying at 20° C., but which volatilizes very rapidly at 150° C., the said resin comprising a resin derived from resin-bearing coals of the Utah type and being obtained from said coals by a process comprising separating the crude resin from the bulk of the coal to produce a resin concentrate of resin admixed with coal, dissolving the soluble resin content of the concentrate in a hydrocarbon solvent to form a 25 to 45 per cent solution, separating the insoluble matter, evaporating the solvent to obtain a dry resin, redissolving the dry resin in isohexane to obtain a 25 to 45 per cent solution, diluting the clear resin solution to about 10 per cent concentration with isohexane, and recovering the precipitated resin.

4. A printing ink comprising pigment dispersed in a vehicle, which comprises a solution of a resin in a petroleum hydrocarbon which is slow drying to substantially non-drying at 20° C., but which volatilizes very rapidly at 150° C., the said resin comprising a resin derived from resin-bearing coals such as are found in Utah, having a melting point of the order of 240–260° C., which is insoluble in isohexane, and which is further characterized by being soluble, together with the lower melting resins of the coal, in isohexane at 25 to 45 per cent total resin concentration at room temperature, but being precipitated on dilution of such solution to 10 per cent concentration with isohexane.

ERNEST D. LEE.
RUPERT J. SCHEFBAUER, Jr.

REFERENCES CITED

The following references are of record in the file of this patent:

UNITED STATES PATENTS

| Number | Name | Date |
|---|---|---|
| 2,409,214 | Lee | Oct. 15, 1946 |
| 2,409,215 | Lee | Oct. 15, 1946 |